United States Patent [19]

Hauger

[11] Patent Number: 5,092,197
[45] Date of Patent: Mar. 3, 1992

[54] DEVICE FOR ADJUSTING AUTOMOBILE SEATS

[75] Inventor: Rolf Hauger, Schiltach, Fed. Rep. of Germany

[73] Assignee: BBS Kraftfahrzeugtechnik Aktiengesellschaft, Schiltach, Fed. Rep. of Germany

[21] Appl. No.: 567,915

[22] Filed: Aug. 15, 1990

[30] Foreign Application Priority Data

Sep. 16, 1989 [DE] Fed. Rep. of Germany ....... 3931042

[51] Int. Cl.$^5$ .................. F16H 37/06; F16H 1/20; A47C 1/00; B60N 2/02
[52] U.S. Cl. .............. 74/665 GA; 74/421 A; 297/330; 297/362
[58] Field of Search .............. 74/665 GA, 421 A; 297/330, 362

[56] References Cited

U.S. PATENT DOCUMENTS

| | | | |
|---|---|---|---|
| 2,668,581 | 2/1954 | Luketa | 297/362 X |
| 3,437,303 | 4/1969 | Pickles | 297/330 |
| 3,686,974 | 8/1972 | Little, Jr. | 74/665 GA |
| 4,299,316 | 11/1981 | Reinmoeller | 74/665 GA |
| 4,365,836 | 12/1982 | Jackson et al. | 297/330 X |
| 4,570,999 | 2/1986 | Harrison | 297/362 |
| 4,776,632 | 10/1988 | Akimori et al. | 297/330 X |

FOREIGN PATENT DOCUMENTS

| | | | |
|---|---|---|---|
| 0067893 | 12/1982 | European Pat. Off. | 297/330 |
| 3530382 | 3/1987 | Fed. Rep. of Germany | 297/330 |
| 2136086 | 9/1984 | United Kingdom | 297/362 |
| 2153218 | 8/1985 | United Kingdom | 297/330 |

Primary Examiner—Leslie A. Braun
Assistant Examiner—Julie Krolikowski

[57] ABSTRACT

In a device for adjusting various parts of an automobile seat, such as its backrest, headrest, etc., there is a switch mechanism (41) with central gearwheel (61) which can be driven by an electric motor. Further gearwheels (101) are arranged distributed at equal distances around the central wheel (61) and can drive the driveshaft for each part to be adjusted. A planetary gearwheel (86) is constantly in engagement with the central gearwheel (61) and is brought selectively into engagement with one of the further gearwheels (101). Only a single electric motor is required for adjusting a plurality of parts.

10 Claims, 4 Drawing Sheets

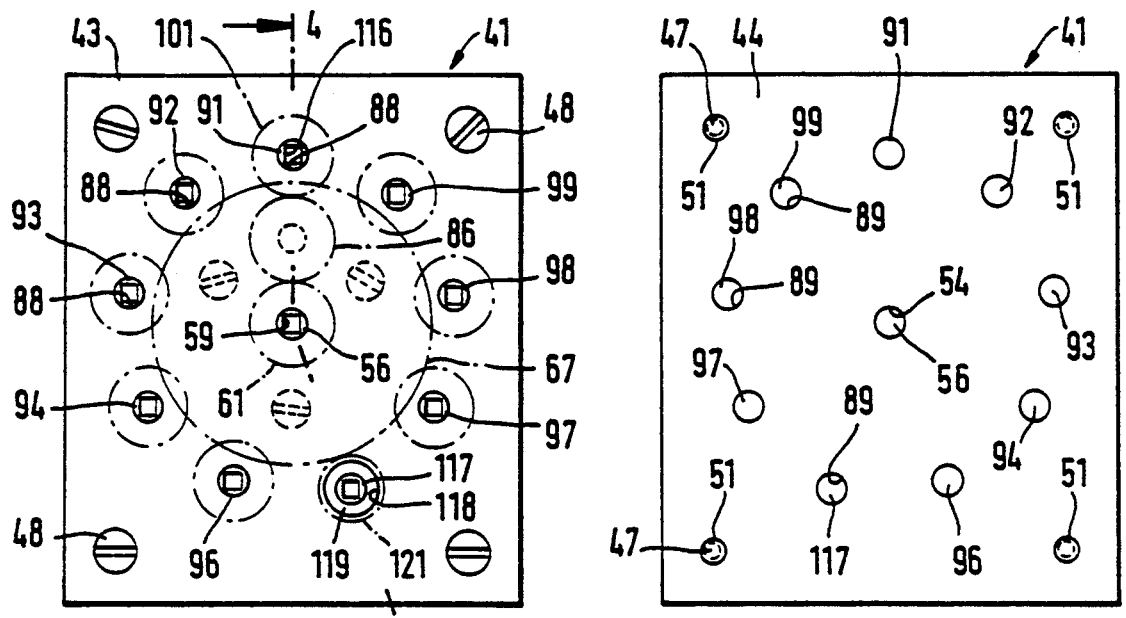
FIG.3
FIG.5
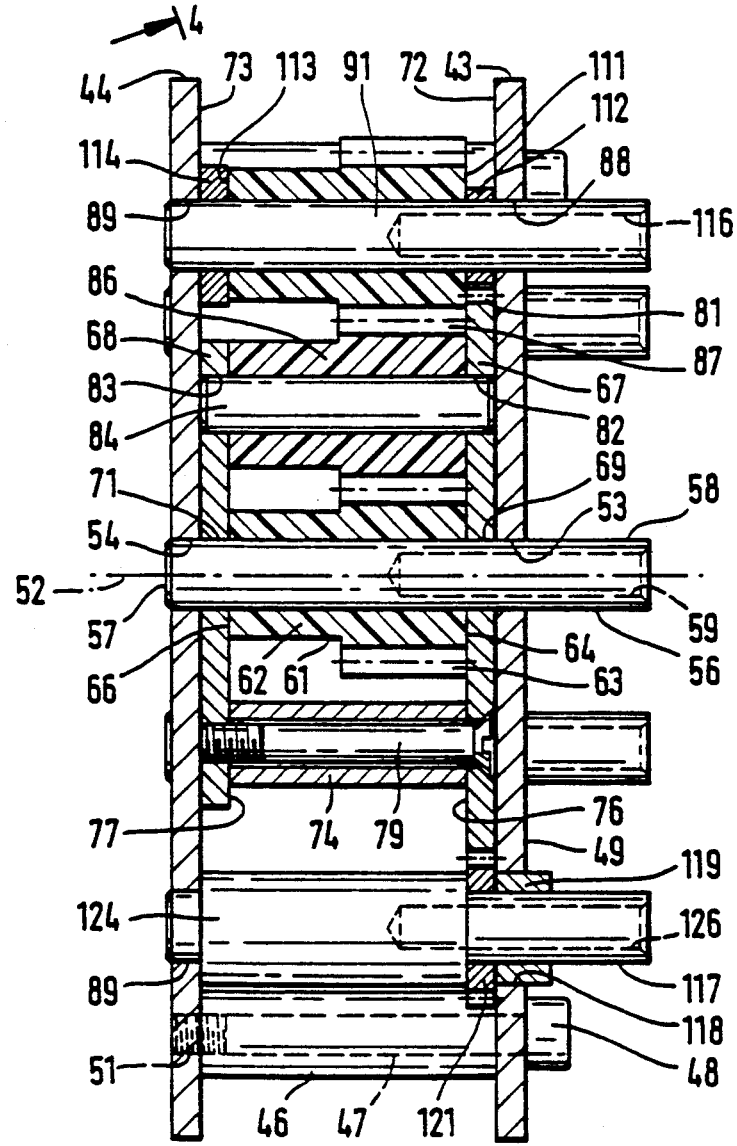
FIG.4

DEVICE FOR ADJUSTING AUTOMOBILE SEATS

BACKGROUND OF THE INVENTION

Nowadays many parts on an automobile seat are adjustable for reasons both of comfort and of health and safety. For example, the height of the headrest can be adjusted. The height and inclination of the lower part of the seat and its distance from the steering wheel can be adjusted. The inclination of the back can be adjusted, and it is possible to adjust supporting bodies which ensure a better lateral guidance of the upper part of the body. Supporting bodies supporting the spinal column, giving the pelvis a proper hold, and so on and so forth, can be adjusted. Numerous electric motors have hitherto been provided in the lower part of the seat and/or of the backrest. A separate electric motor has been assigned to most of the movement convertors. This immediately results in six to eight electric motors in an automobile seat. The individual electric motor has been selected, for example, by means of a rocker switch which has then actuated the movement convertor by a flexible shaft. The movement convertor is usually a worm drive, on the one had because a worm drive can easily be self-locking, and on the other hand because it allows a high reduction.

Disadvantages of the hitherto known technique are as follows:

a) The costs of DM 25.—for each electric motor are a tremendously high amount in series construction.

b) The electric motors considerably increase the weight. On the one hand, the seat becomes heavier. But on the other hand, the automobile also becomes heavier. This also has disadvantages in terms of fuel consumption, for example, because according to a rule of thumb a weight of 100 kg costs a liter of fuel over 100 km.

c) It is difficult to mount the electric motors in the seat, since a good fastening device must, of course, be provided for each electric motor.

d) Problems of space arise in a seat because of the volume of the electric motors, and they often have to be fastened where it is not advantageous per se.

e) With each electric motor, the error rate increases, for this is the lower, the fewer components are used.

f) In view of the above mentioned problems of space, the electric motors often have to be mounted where unfavorable noise conditions arise.

g) Again because of the volume of the electric motors, the backrest for example has to be made sufficiently thick to ensure that the electric motors have room. This means, for example, less leg room for the passengers sitting on the rear seat. This disadvantage necessarily has to affect the entire series, for in principle every seat must be provided with such adjusting devices. Even automobile models, in the seats of which no electric motor at all is installed, are therefore burdened by this disadvantage.

h) Every electric motor requires a feeder line and a discharge line. In view of the high currents, the cables have to be relatively thick, thus leading to the known disadvantages.

i) When there are defects, the upholstery of the seats often has to be opened and then closed again later.

SUMMARY OF THE INVENTION

The object of the invention is to eliminate the above-mentioned disadvantages.

According to the invention, this is achieved by means of a device for adjusting a plurality of parts of an automobile seat having the following features:

a selection device for selecting at least one of said parts, an electric motor for adjusting at least two of said parts, which motor is movable in two directions of rotation, a plurality of movement converters at least indirectly adjusting respective ones of said parts, at least one output shaft between said electric motor and said movement converters, a switch mechanism having an input and at least two outputs, a first driveshaft leading from said electric motor to said input of said switch mechanism, a second driveshaft leading from one of said outputs of said switch mechanism to a respective movement converter, a changeover device in said switch mechanism which can change over selectively from said input to a selected one of said outputs, and a selection line leading from said selection device to said switch mechanism and connected operatively to said changeover device.

Said switch mechanism comprises a central shaft forming said input, a first gearwheel fastened non-rotatably on said central shaft, a plurality of third gearwheels provided axis-parallel and at an equal distance from said central shaft, a plurality of shafts, on which said third gearwheels are fastened non-rotatably, forming said outputs of said switch mechanism.

Said changeover device comprises a cage rotatably supported on said central shaft and a second gearwheel supported by said cage, which meshes with said first gearwheel.

Said switch mechanism further comprises a frame in which said shafts of said third gearwheels are mounted and in which said cage is mounted rotatably.

Said cage is rotatable by means of said selection line, and said second gearwheel meshes with one of said third gearwheels in each of a plurality of switch positions of said selection device.

Said cage comprises two parallel disks of a larger and a smaller diameter respectively and having inner faces, cross members hold said disks at a distance from one another and said inner faces of said disks at least indirectly limit axial moveability of said first and second gearwheels.

Said disk of larger diameter having teeth on its outer circumference forming a toothed rim as part of said changeover device operatively connected to said selection line.

Said frame comprises a front plate and a rear plate parallel to each other at a distance to enclose said cage and said third gearwheels, said shafts supporting said third gearwheels and said first shaft supporting said first gearwheel being rotatably supported in both said front plate and said rear plate.

And a shaft rotatably supporting said second gearwheel is mounted in both of said disks of said cage.

These features provide a switch mechanism which is of an especially small construction and which, for example in contrast to a draw-key transmission, is very short, even when there are many transmission outputs. For example, eight outputs, together with the other necessary parts, can be accommodated in a shallow rectangle of approximately 7×7×3 cm.

By means of these features, the force necessary for the changeover can be introduced into the cage in a simple way and since the outer circumference is large in any case for reasons of design a considerable reduction is obtained, so that the cage is moveable by means of a very small electric motor or by means of only a little force.

These features provide a stable rigid cage which has a long lifetime and which at the same time also influences the functioning of the first and second gearwheel, further constructional elements not being necessary for this.

As a result of these features, the bearings for the gearwheels become simple, and the gearwheels can nevertheless absorb high forces.

The following additional advantageous features will be evident from the descriptions of preferred embodiments.

Said seat includes a backrest and a lower seat part. A first electric motor together with a first switch mechanism are provided in said seat backrest. And a second electric motor and a second switch mechanism are provided in said lower seat part. And the number of said switch mechanism outputs corresponds at least to the number of movement converters in said lower seat part and said backrest respectively. As a result of these features, the number of electric motors is reduced by approximately the factor 2, and there is no need to lay any flexible shafts in the region of the joint between the lower part of the seat and the backrest.

A single electric motor together with a switch mechanism are provided in said automobile seat. And the number of said switch mechanism outputs corresponds at least to the number of movement converters in said automobile seat. As a result, the number of electric motors is reduced in the best possible way. If it is provided in the lower part of the set, the connection paths between it and the selection device are as short as possible. There are no problems of providing flexible shafts in the region of the joint between the backrest and lower part of the seat.

Said electric motor has a rotational speed of 2000-4700 r.p.m. This feature ensures very thin and therefore pliant flexible shafts.

Said first driveshaft is directly connected between said electric motor and said switch mechanism, and said switch mechanism forms a unit with said electric motor. This feature avoids a flexible first part driveshaft. The device is of compact construction and can be produced more cheaply, and there is no need to provide a fastening point either for the motor or for the switch mechanism. On the contrary, a single fastening point is sufficient for both of these.

Said first driveshaft comprises a flexible shaft. As a result, the electric motor can be provided at a point suitable for it and the switch mechanism at another point suitable for this.

Said selection line comprises an electric line and an electric motor. The position of the electric motor can be selected freely as a result, because there is no need to satisfy the conditions which flexible shafts entail. An electric motor activatable in this way in the switch mechanism can also be the precondition for a memory setting in the automobile seat, as is widespread at the present time.

Said selection line is a flexible shaft acting on said toothed rim with an adjusting gear. This feature ensures a simple current-independent activation of the switch mechanism.

Said third gearwheels have end faces and said tooth rim has an inner surface that forms in the region of said teeth a bearing surface for one of said end faces of said third gearwheels and forms a stop limiting axial moveability of said third gearwheels. By these features, a compact design is obtained and the toothed rim performs a dual action.

Said second driveshafts are flexible, and said shafts of said third gearwheels have output sides with polygonal sockets for receiving external polygons of said second driveshafts. These features afford, on the one hand, sufficiently thick shafts or at least shaft butts which are of course part of the gearwheel bearing and, on the other hand, the necessary connections for the flexible shafts.

BRIEF DESCRIPTION OF THE DRAWINGS

The invention is now described by means of preferred exemplary embodiments. In the drawing:

FIG. 3 shows a view of a prototype of the switch mechanism from the output side, FIG. 4 shows a section along the line of 4-4 of FIG. 3 on the scale of 2:1 relative to FIG. 3, FIG. 5 shows the rear side of FIG. 3.

DESCRIPTION OF PREFERRED EMBODIMENTS

Figure 1:
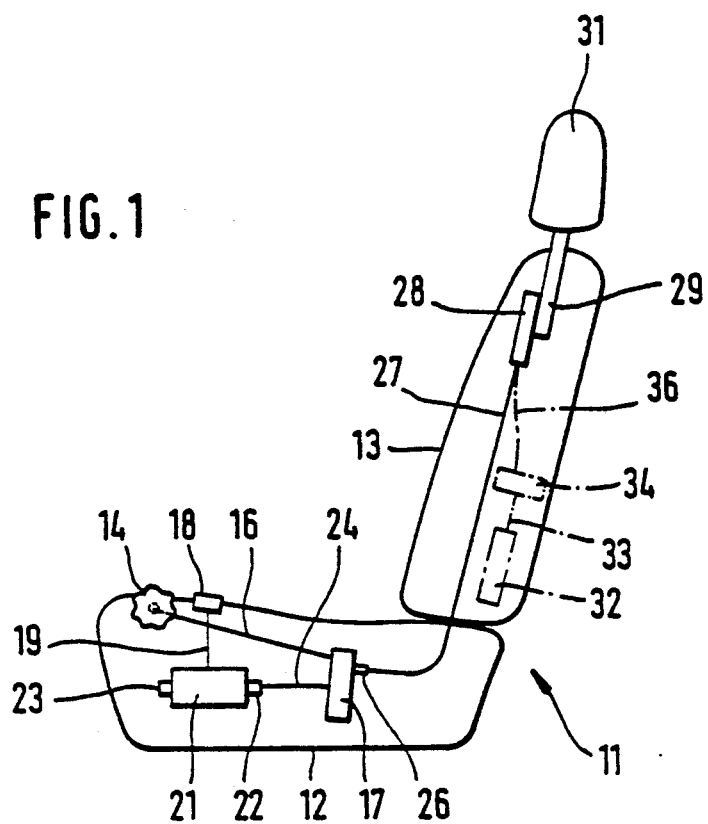
FIG. 1 shows the diagrammatic side view of an automobile seat with the device according to the invention illustrated diagrammatically.

An automobile seat 11 has a lower part 12 and a backrest 13. On the underpart there is a selector wheel 14 which is rotatable and the rotary position of which is communicated to a switch mechanism 17 by means of a flexible shaft 16. Likewise fastened to the lower part 12 is an electric switch 18, by means of which an electric motor 21 can be activated via an electric line 19, specifically both in forward movement and in reverse movement. This is an electric motor used conventionally for those purposes having a power consumption of 35-50 watts and a nominal speed of 2000-4700 r.p.m. The electric motor 21 has an output 22 on the right and an output 23 on the left. By means of a flexible shaft 24, the electric motor 21 supplies rotational energy to the switch mechanism 17 from its output 22. The output 23 serves for supplying rotational energy to further parts which may be required.

The switch mechanism has a plurality of outputs, of which only the output 26 is shown in FIG. 1. A flexible shaft 27 leads from these through the lower-part/backrest pivot point (not shown) into the backrest and there to a movement converter 28, the stator of which is connected firmly to the backrest 13. Its rotor is connected to a holding stirrup 29 of a headrest 31. Depending upon the direction of rotation of the flexible shaft 27, the movement converter 28 moves the holding stirrup 29 upwards and downwards.

Represented by dot-to-dash lines in the backrest 13 is the situation where the electric motor is to be arranged in the backrest 13 as an electric motor 32, together with a flexible shaft 33 and switch mechanism 34, and the movement converter 28 is then actuated via a flexible shaft 36.

Figure 2:
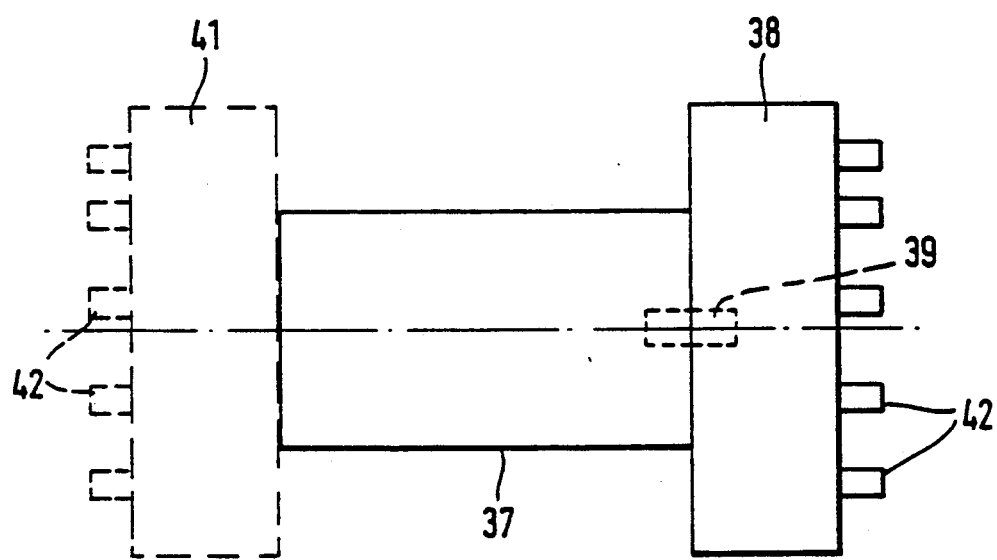
FIG. 2 shows a second exemplary embodiment of the device according to the invention.

According to FIG. 2, the electric motor 37 is not connected to the switch mechanism 38 via a flexible shaft. Instead, the two constructional units are connected rigidly to one another and have a common shaft 39 represented by broken lines here. On the left, FIG. 2 shows by the switch mechanism 41, represented by broken lines, that the second output of the electric motor 37 can be used for driving a further switch mechanism. For the purpose of easier access through the flexible shafts, the outputs 42 face away from the electric motor 37.

The prototype version according to the invention is based on a design in which the gearwheels are made of plastic and the rest is made of metal. For plastic production on a large scale, an appropriate change would have to be made. The switch mechanism 41 comprises a front plate 43 made of metal with the dimensions 66×74 mm. It is rectangular. A rear plate 44 is parallel to and congruent with this. Between their four corner regions there are four spacer sleeves 46 which have a length equal to the clear spacing of the plates 43, 44. They have passing through them screws 47, the head 48 of which is pulled up against the outer face 49 of the plate 43, because the external thread of the shank of the screws 47 is screwed into an internal thread 51. This design is as it were a flexurally resistant, firmly mounted protective first cage.

Figure 8:
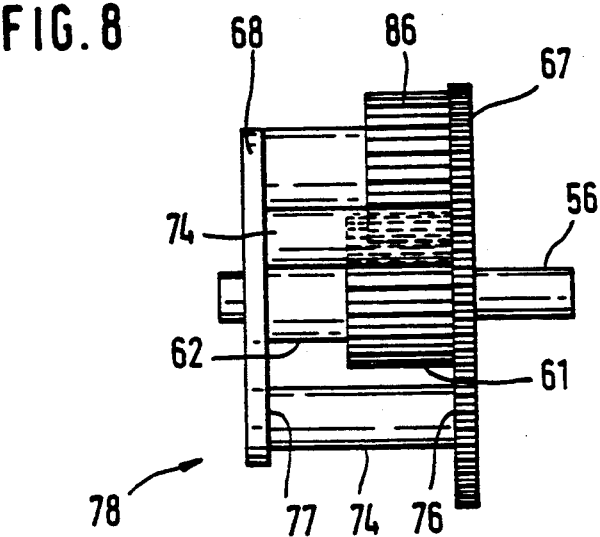
FIG. 8 shows a side view of the cage.
Figure 9:
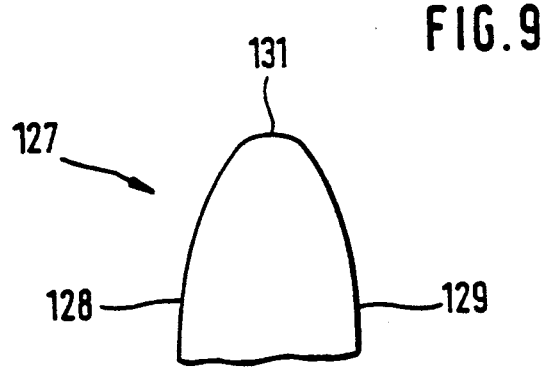
FIG. 9 shows a side view of a tooth.

Circular passage holes 53, 54 are made in alignment with a geometrical center axis 52 in the two plates 43, 44. Mounted rotatably in these is a shaft 56, the end 57 of which projects only slightly beyond the plate 44. The other end region 58 projects to a considerable extent. An outwardly open square socket 59 is made in it. Arranged on the shaft 56 in the position evident from FIGS. 3 and 4, is a first gearwheel 61 which consists of plastic and which with its shank 62 is rotatable relative to the shaft 56 neither in the longitudinal direction nor in the circumferential direction. It has teeth 63 and a front end face 64 and a rear end face 66. In the clear spacing between these end faces, without fixing these in rotation, a front toothed disk 67 and a rear disk 68 are provided coaxially relative to the center axis 52. The toothed disk 67 and the disk 68 have a coaxial circular-cylindrical passage hole 69, 71 by which the toothed disk 67 and disk 68 are mounted rotatably on the shaft 56. The toothed disk 67 is a small distance from the inner face 72 of the plate 43, as is the disk 68 from the inner face 73 of the plate 44. Together with three spacer sleeves 74, which are respectively offset at 120° and which are provided between the inner face 76 of toothed disk 67 and the inner face 77 of the disk 68, a second cage 78 which is held together by means of screws 79 is obtained. The heads 81 of these are countersunk in the toothed disk 67 and are screwed with their end on the left in FIG. 4 into internally threaded holes of the disk 68. Although the shaft 56 can rotate in the cage 78 by means of this cage 78, it cannot move axially beyond the movement play. According to FIG. 8, the disk 68 has a substantially smaller diameter than the toothed disk 67. The latter carries a toothed rim 81 on the outside.

Axis-parallel to the geometrical center axis 52, in the circumferential region of the toothed disk 67 and the disk 68 there are passage holes 82, 83 which support a shaft 84. This does not project beyond the toothed disk 67 and disk 68. It is mounted rotatably in a second gearwheel 86, the teeth 87 of which mesh with the teeth 63. The teeth extend all-round over 360°. The outside diameter of the teeth 87 remains within the tooth bottom of the toothed rim 81. The teeth 87 are therefore not visible, for example in the view of FIG. 3.

Passage bores 88, 89 are provided in the plates 43, 44 axis-parallel to the geometrical center axis 52 and at the same distance from this. The passage bores 88, 89 are arranged with exactly the same angular division. Since nine passage holes are provided, the angula distance amounts respectively to 40°. Mounted in the passage bores 88, 89 are shafts 91, 92, 93, 94, 96, 97, 98 and 99 which represent eight different outputs. They carry non-rotatable gearwheels 101, 102, 103, 104, 106, 107, 108 and 109. Their reference circle lies on such a radius that each of the gearwheels 101 to 109 can mesh with the teeth 87 of the second gearwheel 86. This means that end face 111 of each gearwheel 101 to 109 on the right according to FIG. 4 projects under the toothed rim 81 and is thus prevented from moving too far to the right. This is also prevented to a certain degree by spacer bushes 112. The left end faces 113 bear against spacer bushes 114 which themselves bear against the inner face 73. All the shafts 91 to 99 have hexagon sockets 116.

Figure 6:
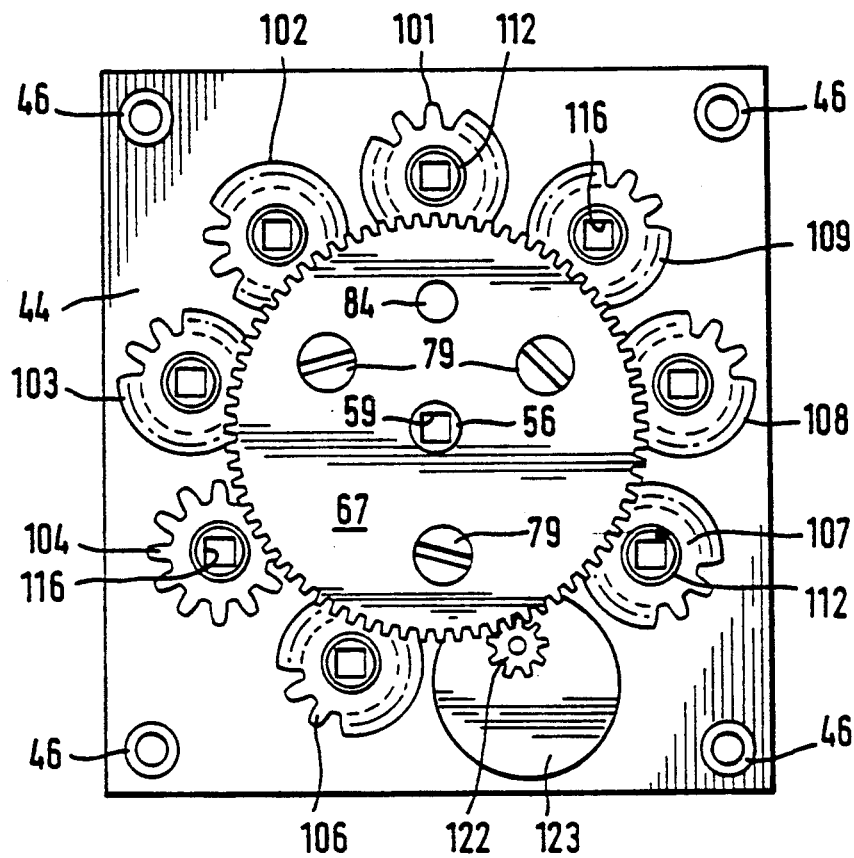
FIG. 6 shows a view like that of FIG. 3, but without the coverplate and with an electric motor.
Figure 7:
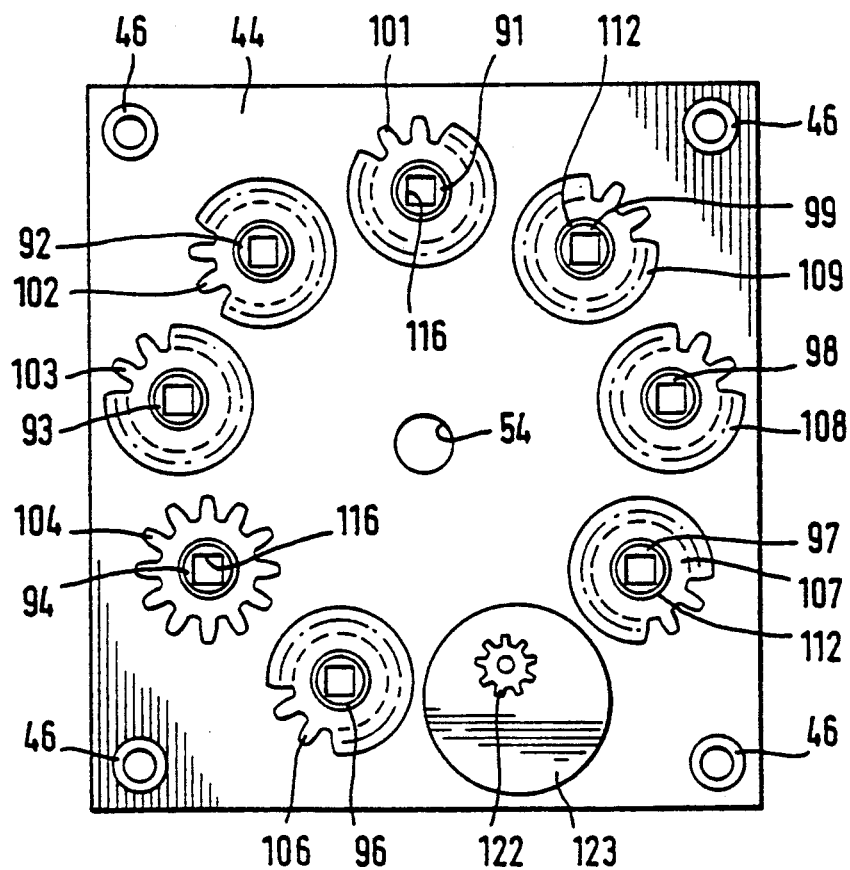
FIG. 7 shows a view like that of FIG. 5, but without a cage.

According to FIG. 3, at approximately 5:30 on a clockface, there is provided for a shaft 117 the passage 89 which is also used otherwise. However, there the diameter of the passage bore 118 is larger than the diameter of the passage bores 88, so that a bearing bush 119 serving as a bearing reinforcement can be received there. This in turn then has an inside diameter according to the inside diameter of the passage bores 88, because the shaft 117 is identical to the shafts 91 to 99 in terms of construction. The shaft 117 carriers radially in alignment with the toothed rim 81 and within the plate 43 a gearwheel 121 which meshes with the toothed rim 81. There corresponds to this gearwheel 121 a gearwheel 122, of the exemplary embodiment according to FIGS. 6 and 7, modified in this respect, this gearwheel 122 being rotated by a micromotor 123. So that the shaft 117 cannot move axially beyond the tolerance, located on the shaft 117 is a spacer bush 124 which bears against the inner face 73 on the one hand and against the gearwheel 121 on the other hand. The shaft 117 has a hexagon socket 126 from the right.

During operation, one end of the flexible shaft 16 is inserted in the hexagon socket 126, so that the gearwheel 121 can be rotated by means of the selector wheel 14. The cage 78 is thereby rotated. A specific position of the gearwheel 86 corresponds to a specific position of the selector wheel 14. If the selector wheel 14 is given detent positions, this ensures that, for example in one detent position, as shown, the gearwheel 86 meshes with the gearwheel 101. If the electric motor 21 is switched on by means of the switch 18, this transmits rotational energy via the flexible shaft 24 to the shaft 56 designed as an input. The teeth 63 and therefore also the teeth 87 rotate. The teeth 101 therefore rotate and therefore so does the flexible shaft 27 which is inserted at one end into the hexagon socket 116. The movement converter 28 is thereby actuated, and depending upon the direction of rotation of the electric motor 21 the headrest 31 moves up or down. According to FIG. 8, a tooth 127 has on both sides flanks 128, 129 which merge into one another at the top with a rounding 131, so the teeth 87 cannot jam on the teeth of the gearwheels 101 to 109.

I claim:

1. A device for adjusting a plurality of parts of an automobile seat, comprising:
   a selection device for selecting at least one of said parts,
   an electric motor for adjusting at least two of said parts, which motor is movable in two directions of rotation,
   a plurality of movement converters at least indirectly adjusting respective ones of said parts,
   at least one output shaft between said electric motor and said movement converters,
   a switch mechanism having an input and at least two outputs,
   a first driveshaft leading from said electric motor to said input of said switch mechanism,
   a second driveshaft leading from one of said outputs of said switch mechanism to a respective movement converter,
   a changeover device in said switch mechanism which can change over selectively from said input to a selected one of said outputs, and
   a selection line leading from said selection device to said switch mechanism and connected operatively to said changeover device,
   wherein
   said switch mechanism comprises a central shaft forming said input, a first gearwheel fastened non-rotatably on said central shaft, a plurality of third gearwheels provided axis-parallel and at an equal distance from said central shaft, a plurality of shafts, on which said third gearwheels are fastened non-rotatably, forming said outputs of said switch mechanism,
   said changeover device comprises a cage rotatably supported on said central shaft and a second gearwheel supported by said cage, which meshes with said first gearwheel,
   said switch mechanism further comprises a frame in which said shafts of said third gearwheels are mounted and in which said cage is mounted rotatably,
   said cage is rotatable by means of said selection line, and said second gearwheel meshes with one of said third gearwheels in each of a plurality of switch positions of said selection device,
   said cage comprises two parallel disks of a larger and a smaller diameter respectively and having inner faces, cross members hold said disks at a distance from one another and said inner faces of said disks at least indirectly limit axial moveability of said first and second gearwheels,
   said disk of larger diameter having teeth on its outer circumference forming a toothed rim as part of said changeover device operatively connected to said selection line,
   said frame comprises a front plate and a rear plate parallel to each other at a distance to enclose said cage and said third gearwheels, said shafts supporting said third gearwheels and said first shaft supporting said first gearwheel being rotatably supported in both said front plate and said rear plate, and
   a shaft rotatably supporting said second gearwheel is mounted in both of said disks of said cage.

2. The device as claimed in claim 1, wherein said seat includes a backrest and a lower seat part, a first electric motor together with a first switch mechanism are provided in said seat backrest, and a second electric motor and a second switch mechanism are provided in said lower seat part, and the number of said switch mechanism outputs corresponds at least to the number of movement converters in said lower seat part and said backrest respectively.

3. The device as claimed in claim 1, wherein a single electric motor together with a switch mechanism are provided in said automobile seat, and the number of said switch mechanism outputs corresponds at least to the number of movement converters in said automobile seat.

4. The device as claimed in claim 1, wherein said electric motor has a rotational speed of 2000–4700 r.p.m.

5. The device as claimed in claim 1, wherein said first driveshaft is directly connected between said electric motor and said switch mechanism, and said switch mechanism forms a unit with said electric motor.

6. The device as claimed in claim 1, wherein said first driveshaft comprises a flexible shaft.

7. The device as claimed in claim 1, wherein said selection line comprises an electric line and an electric motor.

8. The device as claimed in claim 1, wherein said selection line is a flexible shaft acting on said toothed rim with an adjusting gear.

9. The device as claimed in claim 1, wherein said third gearwheels have end faces and said toothed rim has an inner surface that forms in the region of said teeth a bearing surface for one of said end faces of said third gearwheels and forms a stop limiting axial moveability of said third gear-wheels.

10. The device as claimed in claim 1, wherein said second drive-shafts are flexible, and said shafts of said third gearwheels have output sides with polygonal sockets for receiving external polygons of said second driveshafts.

* * * * *